UNITED STATES PATENT OFFICE.

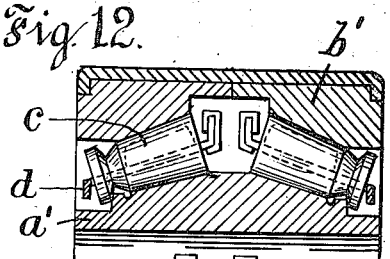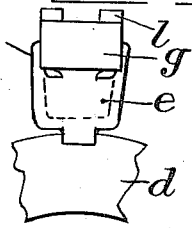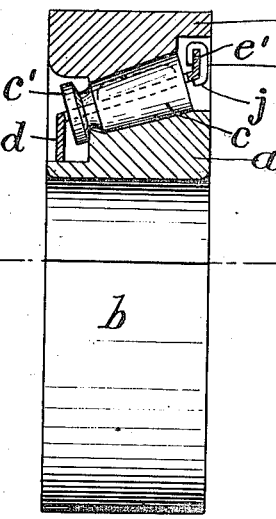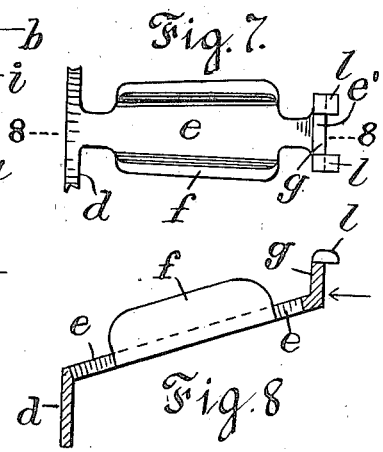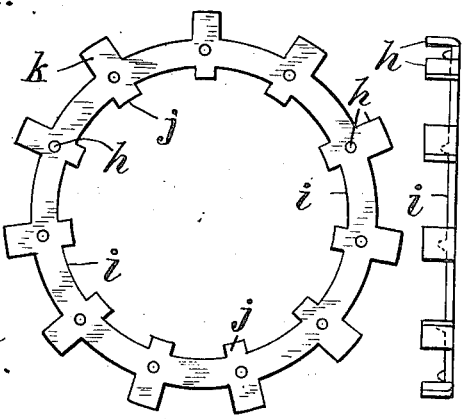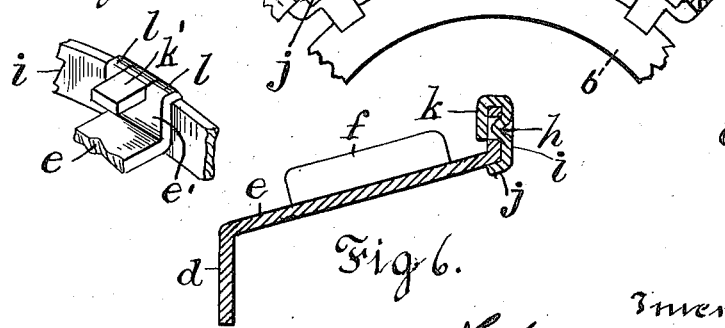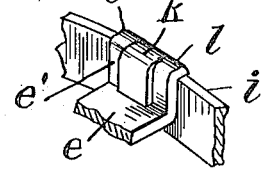

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

ROLLER-BEARING CAGE.

1,183,658.

Specification of Letters Patent.

Patented May 16, 1916.

Application filed July 20, 1915. Serial No. 40,855.

*To all whom it may concern:*

Be it known that I, CHARLES S. LOCKWOOD, a citizen of the United States, residing at 496 Clinton avenue, Newark, county of Essex, and State of New Jersey, have invented certain new and useful Improvements in Roller-Bearing Cages, fully described and represented in the following specification and the accompanying drawings, forming a part of the same.

The present invention relates to a cage for the rolls in a roller bearing, which, by the present improvements, may be formed wholly of sheet metal and stamped from such metal in flat pieces which may be afterward bent to embrace the rolls.

In the present invention, the cage comprises a ring with a series of arms extended laterally therefrom, between which arms the rolls are guided in their movements upon the hub of the bearing, and the free ends of the arms are connected to an annular plate, to which they are locked by suitable means so as to connect them firmly together.

The object of the present invention is to furnish an improved means of locking the arms to the plate so as to secure their proper relation to one another while attaching them to the plate. This is effected herein by bending a lug outwardly upon the free end of each arm and providing such lugs and the annular plate with means for engaging them together to hold the arms positively equidistant from one another, such plate being provided with ears which are bent over the ends of the lugs to lock it firmly thereto.

The invention will be understood by reference to the annexed drawing, in which—

Figure 1 shows in the upper part a longitudinal section of a roller bearing provided with a cage upon one set of rolls, the lower part showing the exterior of the casing; Fig. 2 is an elevation of the cage viewed from its smaller end; Fig. 3 is an elevation for the blank for the annular plate; Fig. 4 is an edge view of the annular plate with the lugs suitably bent thereon to engage the ends of the arms; Fig. 5 shows a portion of the larger end of the cage; Fig. 6 is a section on line 6—6 in Fig. 5. Figs. 2 to 6 show studs and recesses to engage the plate with the ends of the arms; and Figs. 7 to 11 inclusive show an alternative construction for such engagement. Fig. 7 is a plan of one of the arms of the cage; and Fig. 8 is a section on line 8—8 in Fig. 7. Fig. 9 shows the end of the arm opposite to that which is exhibited in Fig. 2; Fig. 10 is a perspective view of the alternative construction for the engaging parts with the ear on the plate clamped upon the lug on the ring; Fig. 11 is a similar view with the parts merely engaged and not locked together by the bending of the ear; and Fig. 12 is a section like the upper part of Fig. 1, showing a bearing with two sets of conical rolls provided with two cages having the present improvements. Fig. 6 to 11 inclusive are on a larger scale than the other figures.

In Fig. 1, the bearing is shown with hub $a$, casing $b$ and tapering rolls $c$, which have each a collar $c'$ upon its smaller end. The cage is shown with ring $d$ at one end and a series of arms $e$ extended laterally from the ring and having their free ends bent outward to form upon each a lug $e'$, as shown in Figs. 1 and 2. Wings $f$ are shown upon the edges of the arms, between which the rolls are fitted to be guided thereby.

Each lug is formed, as shown in Figs. 2 and 6, with a hole $g$ to engage a stud $h$ upon the annular plate $i$. The plate is shown in Fig. 3 formed with ears $j$ upon its inner edge adjacent to the stud $h$, and with ears $k$ opposite to the same upon the outer edge of the plate.

The studs are formed equidistant from one another upon the plate and are thus adapted to engage the holes $g$ in the several arms so that when engaged therewith, as shown in Fig. 6, the arms are held from bending in any direction. When the studs are thus engaged with the holes in the lugs, the plate is locked to the lugs by bending the ears $k$ over the tops and inner sides of the lugs, as shown in Figs. 1, 5 and 6.

Before fitting the plate to the lugs, the ears may be bent transverse to the plane of the plate, as shown in Fig. 4, so that all of the lugs $e'$ will fit within such lugs and be held from slipping upon the plate. The inner ears $j$ may also be bent inwardly, as shown in Fig. 1, to fit the inner corners of the lugs $e'$, the lugs being thus seated upon the plate between the ears $j$ and $k$ before the locking of the parts together is effected by clenching the ears $k$ over upon the lugs in the manner shown in Fig. 6. When the plate is thus locked to the arms they are held immovably upon the plate by the engagement of the studs $h$ with the holes $g$ and by the clenching of the ears $k$ upon the lugs.

Figs. 1 and 2 show the arms $e$ bent at a suitable angle to the ring $d$ to aline with the centers of the rolls $c$, which are inclined to the axis of the hub so as to resist longitudinal thrust; but it is obvious that as the arms are free from one another at one end, they can be made integral with the ring $d$ by stamping the whole from a flat sheet of metal and then bending the arms laterally to the ring. The ring is commonly made of suitable form to fit a collar upon the hub, as shown in Figs. 1 and 12, the latter figure showing the same arrangement of rolls and cage as Fig. 1, but duplicated in the opposite ends of the casing $b'$. The annular plate $i$ is also made by stamping from sheet metal, and the whole cage is thus formed of merely two pieces of sheet metal stamped and bent to the desired form.

An alternative engagement for the ends of the arms with the annular plate is shown in Figs. 7 to 11 inclusive, in which modification the ears $k'$ upon the annular plate are made narrower than the lugs to fit between two prongs $l$ which are formed upon the corners of the lugs and bent outwardly to hook over the periphery of the plate at opposite sides of the lugs $k$, as shown in Figs. 10 and 11.

The ear $k'$ upon the plate in Fig. 11 is shown bent transversely to the plate, the same as in Fig. 4, and fits snugly between the lugs prongs or hooks to prevent any lateral movement of the arm upon the plate. With the parts in this shape, the plate may be fitted to the ends of all the lugs with the hooks $l$ overlapping the edges of the plate and the ears $k'$ lying between the hooks, as shown in Fig. 11. When the ears $k'$ are clenched over upon the inner side of the lug $e'$, the parts are locked firmly together and no accidental displacement is possible.

It is obvious that the invention is applicable to a cage in which the arms lie in a cylindrical curve instead of a conical curve, as represented in Figs. 1 and 12 of the drawing, which arrangement would adapt them to operate with cylindrical rolls rotating upon a cylindrical hub.

It is immaterial at what angle the arms be bent laterally or sloped upwardly from the ring $d$, and it is immaterial whether any means be employed to engage the free ends of the arms with the plate $i$, as a strong connection of the arms to the plate can be effected by the clenching of the ears upon the lugs.

The invention therefore consists broadly in a cage having arms with the lug bent outwardly from the free end of each arm, and an annular plate fitted to the outer sides of such lugs, and having ears clenched over the outer ends of the same to secure the arms to the plate. Means is also essential to engage or center the ends of the arms with the annular plate, so that during the process of clenching the ears upon the lugs there may be no displacement of the arms. Heretofore, rivet-holes have been formed in the lugs, and corresponding rivet-holes in the annular plate, but the rivets are liable to be tipped or staggered when they are headed over and the arms thus somewhat displaced. By the use of the means shown herein, the annular plate is secured to the ends of the arms without any rivets, and the clenching of the ears $k$ over upon the lugs of the arms does not have any tendency to displace them.

Having thus set forth the nature of my invention what is claimed herein is:

1. In a roller-bearing, a cage for a set of rolls, comprising a ring with a series of arms extended laterally therefrom and provided with wings to embrace the opposite sides of the rolls, a lug bent outwardly upon the free end of each arm, and an annular plate fitted to the outer sides of said lugs and having ears bent over the outer ends of the lugs to hold the arms in place.

2. In a roller-bearing, a conical cage for set of taper rolls, comprising a ring with a series of arms sloped upwardly therefrom and provided with wings to embrace the opposite sides of the rolls, a lug bent upwardly upon the upper end of each arm, and an annular plate fitted to the outer sides of said lugs and having ears bent over the lugs to hold the arms in place.

3. In a roller-bearing, a conical cage for a set of taper rolls, comprising a ring with a series of arms sloped upwardly therefrom and provided with wings to embrace the opposite sides of the rolls, a lug bent outwardly upon the upper end of each arm, an annular plate fitted to the outer sides of said lugs, means upon the lugs and plate to engage each lug with the surface of the plate, and an ear upon the plate adjacent to each lug bent over such lug to clamp it to the plate in its engaged position.

4. In a roller-bearing, a cage for a set of rolls, comprising a ring with a series of arms extended laterally therefrom and provided with wings to embrace the opposite sides of the rolls, a lug bent outwardly upon the free end of each arm, an annular plate fitted to the outer sides of said lugs, means upon the lugs and plate to engage each lug with the surface of the plate, and the plate having ears projected outwardly and inwardly from its edges to coincide with the said lugs, the inner ears being bent under the bases of the lugs and the outer ears being bent over the outer ends of the same.

5. In a roller-bearing, a cage for a set of rolls, comprising a ring with a series of arms extended laterally therefrom and provided with wings to embrace the opposite sides of the rolls, a lug bent outwardly upon the free end of each arm, an annular plate fitted to the outer sides of said lugs, depressions in one of said members and conical studs upon the other member to engage the lugs with the said plate, and ears upon the plate bent over the lugs to maintain such engagement.

In testimony whereof I have hereunto set my hand.

CHARLES S. LOCKWOOD.